United States Patent [19]

Wood

[11] 4,446,181

[45] May 1, 1984

[54] MANUFACTURE OF TUBULAR LAMINATES

[75] Inventor: Eric Wood, Wakefield, England

[73] Assignee: Insituform International Inc., Monrovia, Liberia

[21] Appl. No.: 363,625

[22] Filed: Mar. 30, 1982

Related U.S. Application Data

[63] Continuation of Ser. No. 77,538, Sep. 21, 1979.

[30] Foreign Application Priority Data

Sep. 28, 1978 [GB] United Kingdom ............... 37737/78

[51] Int. Cl.³ .......................... B32B 7/08; F16L 7/00
[52] U.S. Cl. ..................................... 428/36; 112/424; 112/426; 112/428; 138/128; 138/151; 156/93; 156/203; 156/218; 156/294; 156/304.2; 156/304.3; 428/104

[58] Field of Search ............... 112/262.2, 267.1, 424, 112/426, 428; 138/128, 151, 156, 158; 156/93, 203, 217, 304.2, 218, 294, 304.3; 428/36, 104

[56] References Cited

U.S. PATENT DOCUMENTS

| | | | |
|---|---|---|---|
| 3,246,621 | 4/1966 | Copeland | 156/93 X |
| 3,420,731 | 1/1969 | Kuhn | 428/104 X |
| 4,009,063 | 2/1977 | Wood | 156/294 X |

*Primary Examiner*—Robert A. Dawson
*Attorney, Agent, or Firm*—Fred Philpitt

[57] ABSTRACT

A tubular lining for lining passages is formed, such liner being constructed from a laminate comprising a resin absorbent layer and an impermeable skin. The laminate is wrapped to tubular form with the skin outermost and the free edges are butted together and are connected in this condition by a sewing operation. A sealing ribbon as applied over the sewing to seal the seam and stitching to prevent the flow of liquid or synthetic resin through the seam when the lining is used.

5 Claims, 8 Drawing Figures

MANUFACTURE OF TUBULAR LAMINATES

This is a continuation of application Ser. No. 077,538, filed Sept. 21, 1979 and the benefits of 35 USC 120 are claimed relative to it.

This invention relates to the manufacture of tubular laminates comprising an inner layer of a resin absorbent material, such as a fibrous felt and an outer skin of synthetic plastics material.

These laminates, frequently referred to as "bags", are for insertion in pipelines or passageways to line same with the resin absorbent layer, impregnated with, so as to be immersed in, a curable resin. When the bag lines the pipeline, the absorbent layer is located closer to the passageway surface than the said skin, and the laminate is held in position by fluid under pressure until the resin has set sufficiently hard to form a hard protective resin pipe, with the absorbent material embedded therein, shaped to the passageway surface, and having a smooth internal surface defined by the skin.

The normal method of inserting the laminate is to evert it into the passageway or pipeline from one end thereof, the eversion being effected by using a liquid to evert the laminate and also buoyantly to support the laminate as it travels into the passageway or pipeline through the already everted portion thereof. This method is used when the laminate is pre-impregnated with the resin by injecting resin into the laminate or bag prior to eversion thereof. Even when the laminate is impregnated during eversion (i.e. in the pipeline or passageway) the laminate, as it will still be of measurable weight, is best supported by liquid as it is everted into the pipeline or passageway.

As will appear clear hereinafter however, the method of inserting the bag is not part of the present invention, nor is the material which is used to impregnate the absorbent layer. The most common material for this purpose is the resin described, and other materials such as cementitious or bituminous materials can be used.

The present invention is in fact concerned with the manufacture of the laminate but it is important to appreciate the end use of the laminate to understand the problems which have been experienced therewith.

The normal method of manufacture for the laminate is to start with a laminate web comprising the absorbent layer and skin and to overlap the edges to form a tube, the overlapping edges being joined by sealing strips or the like.

The problem which arises in connection with the use of such laminates is that the overlapped portions define a seam of substantially greater thickness than the remainder of the laminate and when the laminate is everted extra stresses are placed upon the seam, i.e. at the very location where, desireably, high stresses should be avoided, because the seam heretofore has been the weakest part of the laminate. Also, it has been a problem effectively to seal the seams so that there will be no leakage of the resin or liquid through the laminate.

As a result of manufacture the laminate in the manner described, failures in the form of leakages and bursting of laminates at the seams during installation have resulted.

The present invention aims at providing a method of manufacturing laminates as described whereby the aforesaid difficulty may be avoided.

According to the invention there is provided a method of producing a tubular liner which is for lining a passageway or pipeline when impregnated with curable synthetic resin, wherein the tubular laminate is formed from a flat web laminate comprising a resin absorbent layer on one side of which is an impermeable layer, the method comprising the steps of feeding the web in the direction of its length and, while the web is being fed, forming it to tubular configuration so that the impermeable layer lies to the outside, and so that the free edges come into butting relationship, sewing the said edges together while they remain in butting relationship by means of stitching which extends across the seam, and applying a sealing ribbon or coating on the outside of the tubular laminate and over the stitching to prevent leakage of resin through the stitching holes when the laminate is being installed.

When a sealing ribbon is used it is preferably unwound from a roll of such material and is heat sealed to the skin of the laminate, over the said stitching holes.

The manufacturing preferably is continuous and the skin may be for example polyurethane or polyvinylchloride, the strip being a compatible heat sealable material. When polyurethane is used, it may be necessary to include a reinforcing screen in the ribbon because when heating polyurethane it is easy to make it unhandable. PVC is much more stable over a wide temperature range and therefore is preferred. The absorbent material may be a polyurethane or polyester fibrous felt.

It is not usual to stitch together butted edges to make a tube. Normally, sewing can only be effected by bringing the regions of the material adjacent the edges face to face, with the edges facing in the same direction, the sewing being effected through the overlapped regions. When such a tubular laminate is opened out, there are two excess edge strips which either face outwards or inwards depending upon whether the tubular structure is turned inside out (as it would be in the case of portions of items of apparal such as trouser legs or jacket sleeves which have a sewn seam) or not.

There is also described herein a novel form of sewing operation which has been specifically designed for sewing together butted edges of material and which works very satisfactorily in connection with the manufacture of tubular laminates in accordance with the present invention.

An embodiment of this invention will now be described, by way of example, with reference to the accompanying drawings, wherein.

Figure 1:
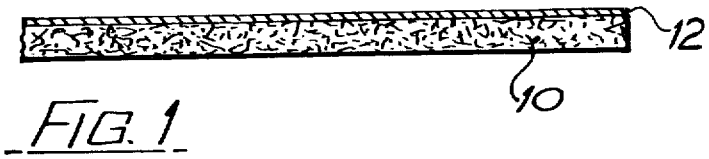
FIG. 1 shows in section a piece of the laminated material to be formed into a tubular laminate in accordance with the said embodiment of the invention.

Referring to the drawings, in FIG. 1 there is shown a section of a web of laminate material which is used for forming the tubular laminate in accordance with the present invention. The material in this example comprises a relatively thick layer 10 of the fibrous felt material which serves as the layer for absorbing the resin in the manner explained herein, and laminated to the felt is a skin or membrane 12 of synthetics plastics material which in use acts as a balloon whereby the laminate can be shaped by fluid pressure to the pipeline or passageway to be lined. The felt 10 may be of polyurethane or polyester fibrous material manufactured by conventional needling processes, whilst the skin 12 may be a coating of PVC or polyurethane applied in any suitable manner.

Figure 2:
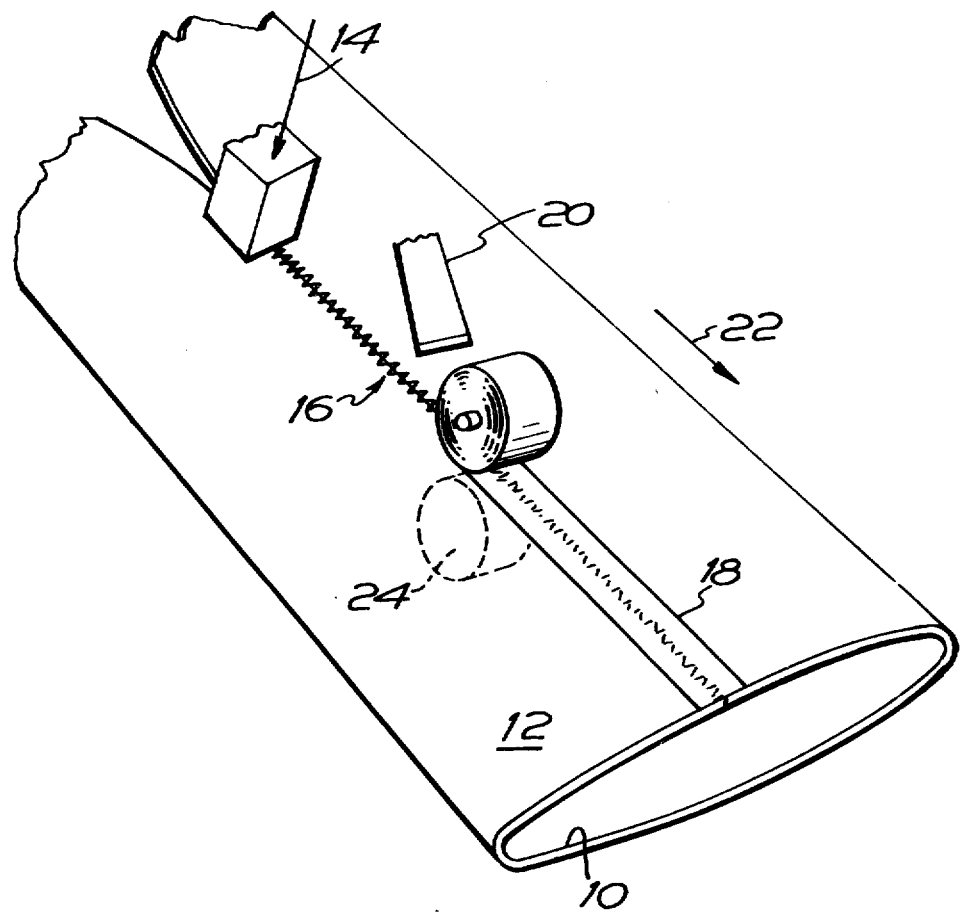
FIG. 2 illustrates in perspective view how the tubular laminate is manufactured in accordance with the said embodiment of the invention.

FIG. 2 shows how the web of material of which a section is shown in FIG. 1, is formed into the tubular laminate. The web is fed from a roll with the skin side facing downwards and the edges are rolled over to meet a sewing apparatus 40 which sews the edges together whilst they are in face to face in butting contact in order that the said edges will be held together and there is applied subsequently and over the stitching 16 a ribbon 18 (which may be a hot extrudate) of synthetic plastics material which is sealed to the outer skin. In this example a heating apparatus 20 softens the strip material before it is applied to the skin 12, and indeed the softened material can seal the needle holes formed by the stitching operation 16.

The heating apparatus 20 is preferably a hot air blower and is arranged to be deflected out of the impingement position on the ribbon 18 in the event of movement of the tubular laminate in the direction 22, ceasing. The edges of the laminate adjacent the seam may also be heated prior to the application of the ribbon 18. The operation when started is continuous, and tubular laminates of the order of 200 and 300 meters can be produced by the method. There may be a pressure roller 24 or a flat anvil plate arranged to press against the ribbon 18 in order that the soft ribbon will be nipped or pressed to the skin 12 over the butting edges of the laminate to form a sealing strip. If the outer skin 12 is PVC and the ribbon 18 is also PVC an extremely good seal is achieved between the skin and ribbon and a very effective and strong seam of minimum additional thickness as compared to the remainder of the laminate, is achieved. The ribbon 18 can be of a yieldable material, as the stitching 16 will in fact take the strain across the seam when the laminate is subsequently used as described herein. It is preferred that the strength of the seam be taken by the stitching and therefore the strip 18 is preferably of a yieldable material. A tubular laminate produced in accordance with the method can be everted extremely satisfactorily in the manner hereinbefore described, even after the interior of the laminate has been impregnated with a curable resin in which the felt layer 10 becomes soaked and embedded.

Figure 3:
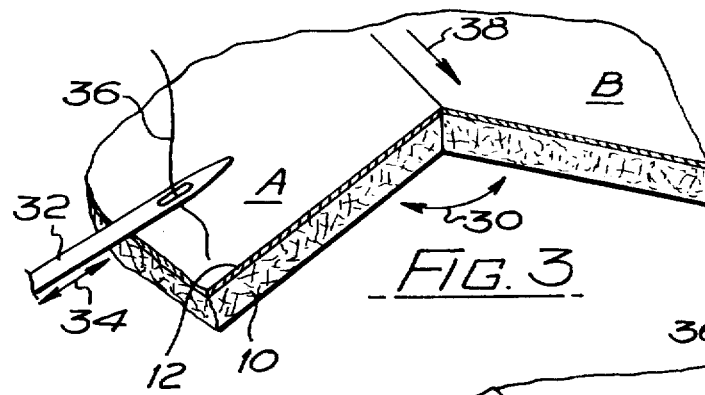
FIGS. 3 to 8 illustrate, in perspective views respective stages in forming the stitch formation holding the butted edges of the tubular laminate shown in FIG. 2, except for FIG. 5 which is a sectional view taken on line V—V of FIG. 4.

Referring to FIGS. 3 to 8, these Figures show how the stitching 16 is formed, and referring firstly to FIG. 3, it will be seen that the two edges A and B of the laminate material to be sewn together are arranged in butting contact, but are such that they define an inverted V-shape in section, the V angle being indicated by numeral 30 in FIG. 3. By this arrangement, a single straight needle 32 reciprocating horizontally as indicated by arrow 34 can penetrate both edge A and B. The needle 34 carries a strong yarn or twine 36, and it should be borne in mind that the two edges A and B during the sewing operation in fact move continuously in the direction of arrow 38.

Figure 4:
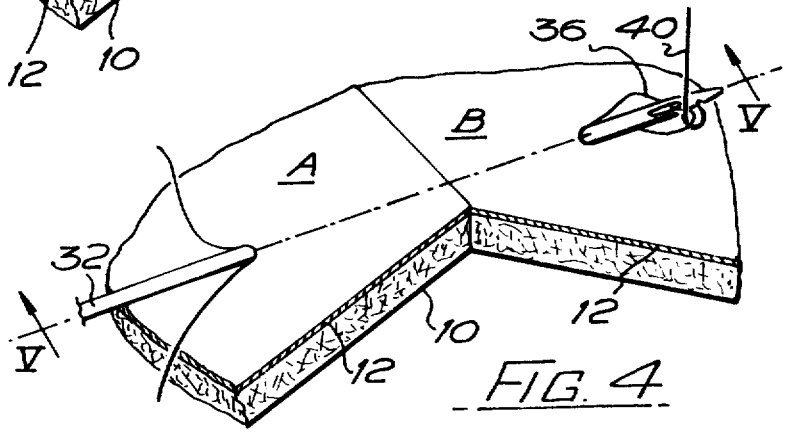

FIG. 4 shows the needle 32 after it has penetrated both edges A and B and the end carrying the yarn 36 has projected through edge B. It should be mentioned that the needle 36 penetrates the skin 12 on edge A and emerges from the skin 12 on edge B. When the needle head emerges, the loop of twine is engaged by a looper 40, thereby to retain a loop of twine which will form a lock stitch, as described herein.

Figure 5:
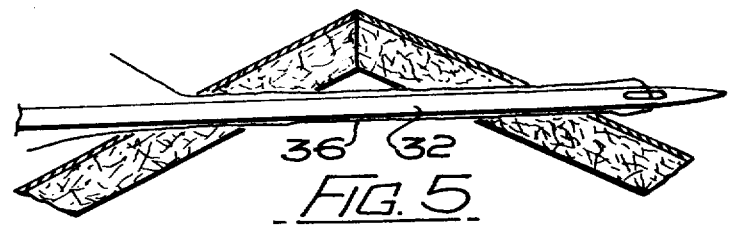

Referring briefly to FIG. 5, this figure shows how the needle 32 penetrates through the space of the V-section defined by the two edges A and B, and carried across this space are lengths of the twine 36 to assist in holding the butted edges of the laminate together.

Figure 6:
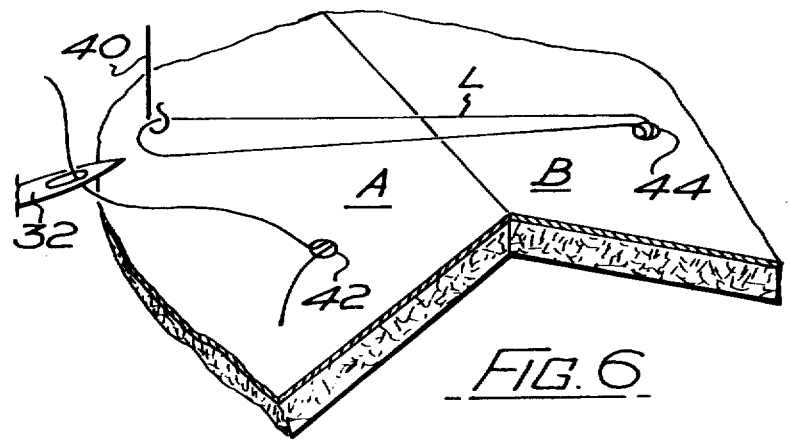

Referring now to FIG. 6, this Figure shows the position after the needle 32 has retracted from the FIG. 4 position, and a loop L of the twine has been retained by the looper 40, which has now moved across the butting edges A and B as shown in FIG. 6 and is presented to the needle 32 which is ready to make a further penetration stroke similar to the stroke illustrated in FIG. 4, but by the time this stage has been reached, the laminate has advanced in the direction of arrow 38, and therefore the previous holes 42 and 44 made in the edges A and B by the needle 32 have advanced out of the path of reciprocation of the needle.

Figure 7:
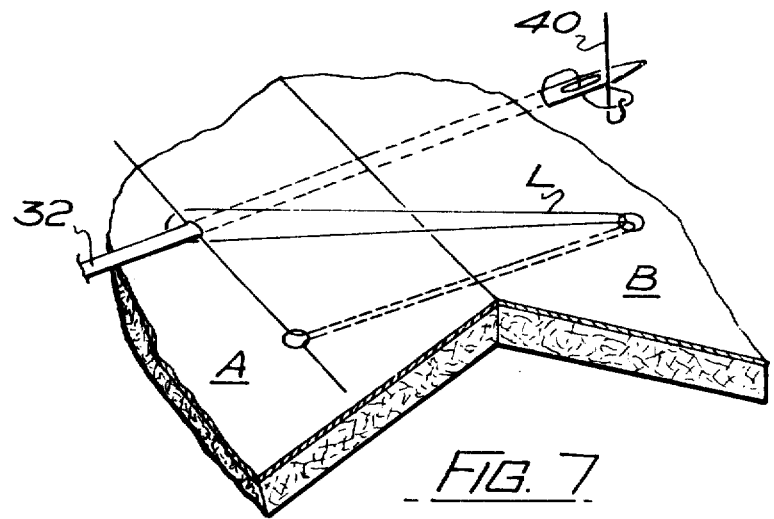
Figure 8:
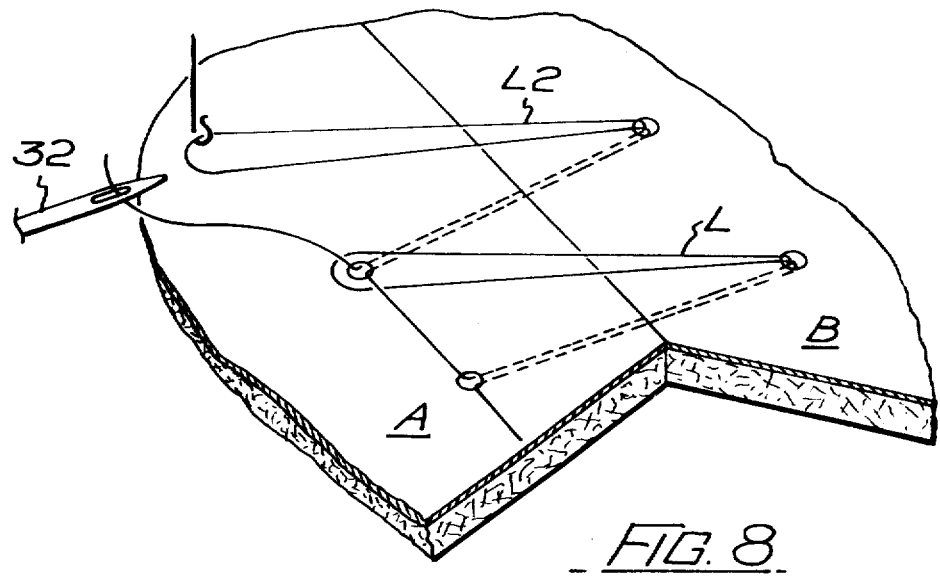

FIG. 7 shows a stage similar to FIG. 4 in that the needle 32 has again penetrated the edges A and B, but this time the needle 32 has passed through the loop L which is therefore locked in position and forms a bridge across the butting edges A and B. FIG. 7 also shows that the looper 40 has once more traversed the butting edges, and has picked up the loop of twine in the region of the eye of the needle. The procedure repeats in that the needle 32 now retracts, and the looper 40 carries a further loop L2 as shown in FIG. 8 across the seam and has presented the loop L2 once more to the retracted needle 32, so that when the needle 32 again effects a penetration stroke, a further locking stitch will be formed. The process of course repeats cyclically to form a long sewn seam illustrated by 16 in FIG. 2, and great lengths of tubular laminate can be produced by this method.

It will be seen that an effective stitching operation results and the sewing thread as well as being interlocked effectively bridges the butt face seam between the edges A and B effectively holding same together prior to the covering thereof by means of the sealing ribbon. The resulting structure is extremely strong in the region of the seam and the thickness of the structure in the region of the seam is increased only minimally. Laminates constructed in accordance with the invention can effectively be everted as described herein.

The equipment for manufacturing the laminates described is relatively simple and inexpensive.

I claim:

1. A method for the continuous production of tubular liner in long lengths which is for lining a passageway or pipeline when impregnated with curable synthetic resin, wherein the tubular liner is formed from a supply of a flat web laminate comprising a resin absorbent layer, on one side of which is bonded an impermeable layer, the method comprising the steps of feeding web continuously in the direction of its length and while the web is in said continuous motion effecting the step of (i) forming it to tubular configuration so that the impermeable layer lies to the outside, and so that the free edge faces come into butting relationship (ii) sewing the said edges together while they remain in edge face to edge face butting relationship by means of stitching which extends across the seam, and (iii) applying a sealing ribbon or coating on the outside of the moving tubular liner and over the stitching to prevent leakage of resin through the stitching holes when the liner is being installed.

2. A method according to claim 1 wherein a sealing ribbon is used and it is unrolled from a reel of such material, and is heat sealed to the outer skin of the laminate, over the stitching holes.

3. A method according to claim 2 wherein the ribbon is applied to said seam under pressure against a reaction roller or anvil plate.

4. A method according to any one of claims 2 to 3 wherein the stitching is effected by reciprocating a needle through both of said free edges while they lie in edge face to edge face butting relationship but define an inverted V-shape in section so that a straight needle penetrates each edge by being moved transversely of the V-shape.

5. A tubular laminate produced by the method according to any one of claims 1, 2, or 3.

* * * * *